Oct. 15, 1935.   J. MORRIS   2,017,371
PRODUCTION OF CAM SHAFTS AND OTHER NONCIRCULAR OR ECCENTRIC BODIES
Filed July 5, 1934
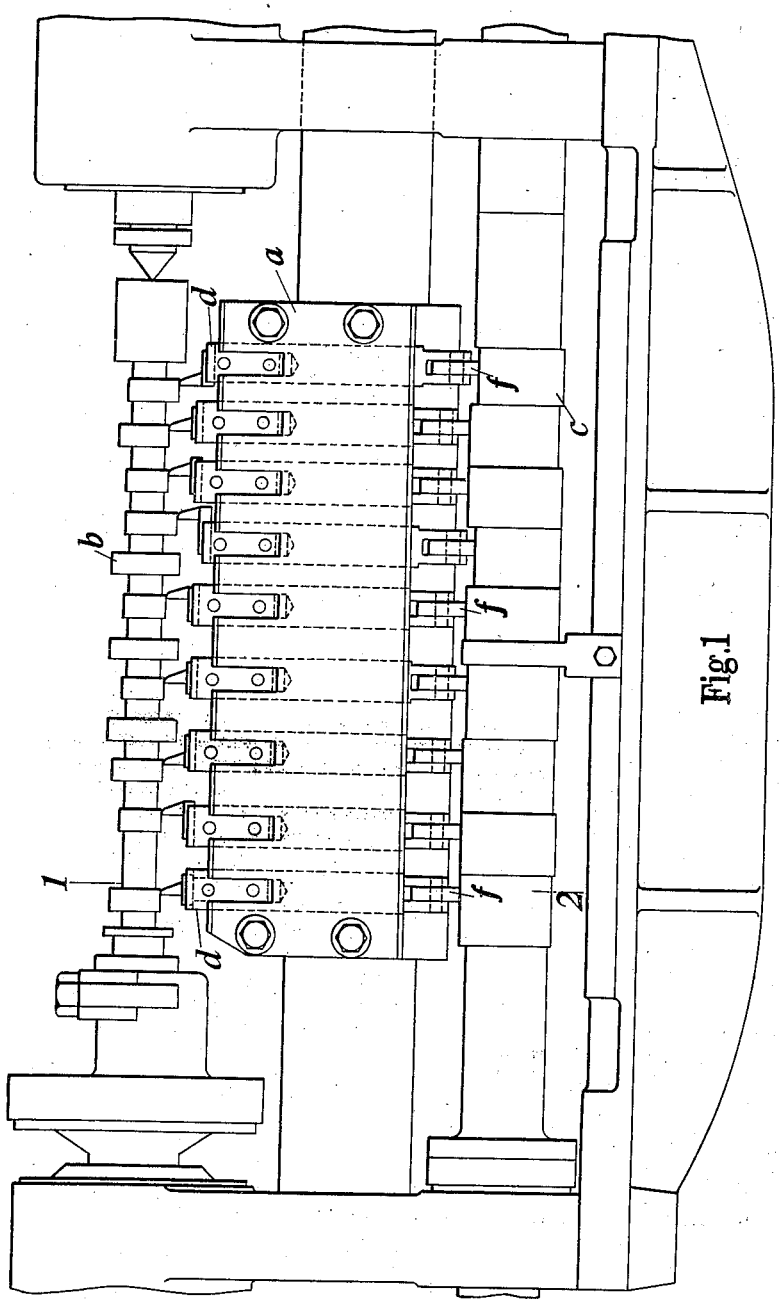
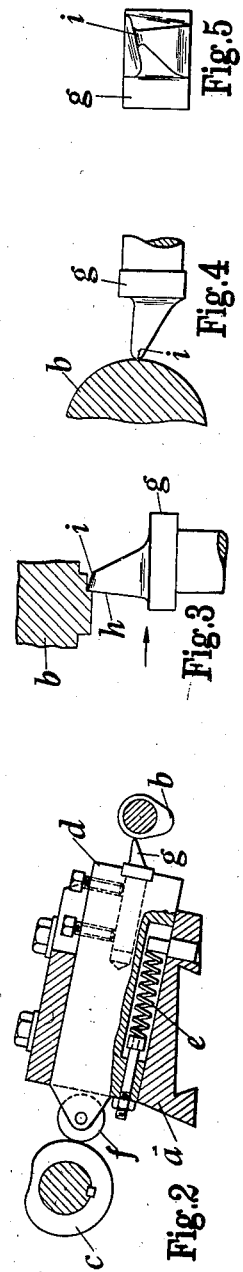
J. Morris
INVENTOR
By: Marks & Clerk
Attys.

Patented Oct. 15, 1935

2,017,371

UNITED STATES PATENT OFFICE 2,017,371

PRODUCTION OF CAM SHAFTS AND OTHER NONCIRCULAR OR ECCENTRIC BODIES

John Morris, Wolverhampton, England, assignor to Sunbeam Motor Car Company Limited, Wolverhampton, England Application July 5, 1934, Serial No. 733,891
In Great Britain July 27, 1933

3 Claims. (Cl. 82—19)

This invention relates to means for the production, more particularly of cam-shafts for internal combustion engines, but it is applicable to the production of other analogous non-circular or eccentric bodies.

The procedure ordinarily adopted in the cutting of cam-shafts is to mount the work-piece in a lathe, and arrange parallel with the work-piece a master pattern which rotates at the same rate as the work-piece. Between these two parts is arranged the cutting tool (or a plurality of tools) which while traversing along the work-piece is caused by the pattern to move to and fro at right angles to the axis of the work-piece. It is common knowledge that great difficulty is experienced in producing work of the highest order of accuracy in this way, and various devices of a rather complicated character have been proposed and are in actual use for enabling the necessary accuracy to be attained.

The object of the present invention is to enable the accurate shaping of cam-shafts and other analogous bodies to be effected by simple means in an expeditious and satisfactory manner.

The invention comprises for use in a machine of the lathe type, a cutting tool having a side cutting edge and also having a rounded extremity at the end which comes into contact with the work-piece, the rounded part being such that it forms a continuation of the cutting edge and extends from the upper towards the under side of the tool.

Also the invention comprises the combination of a holder for a tool as above specified, which can be reciprocated at right angles to the axis of the work-piece, and a master pattern with which one end of the holder co-operates.

In the accompanying sheet of explanatory drawing:—

Figure 1 is a plan of a part of a machine provided with this invention for shaping engine crank shafts, and Figure 2 is a cross section on the line 1—2, Figure 1.

Figure 3 is a plan and Figure 4 a side elevation (in the direction of the arrow in Figure 3) illustrating the cutting tool in relation to the work-piece.

Figure 5 shows the front end of the cutting tool.

In carrying the invention into effect as shown, I mount on the slide $a$ which is situated between the work-piece $b$ and master pattern $c$ and is arranged to move along the work-piece, a plurality of tool holders $d$ capable of reciprocating under the action of the master pattern at right angles to the axis of the work. The tool holder is held in contact with the pattern by a strong spring $e$, and preferably the end in contact with the pattern is provided with an anti-friction roller $f$. At the other end of the holder is mounted the cutting tool $g$. This tool has its cutting edge $h$ at one side or face. That is to say, the cutting edge is at right angles or approximately at right angles to the axis of the work-piece, the cutting edge being backed-off in the usual manner both along its upper edge and at the end in contact with the work-piece. Further, the end $i$ in contact with the work-piece is rounded. The rounding forms a continuation of the cutting edge $h$ and extends from the upper towards the under side of the tool as shown in Figures 2 and 4. This rounding of the end of the tool is an essential part of the invention and requires close attention if the highest success is to be attained. The amount of rounding depends on the size and shape of the work-piece and will vary with different conditions. To give one example, in a tool for use in the production of the cam-shafts employed in motor vehicle engines, the rounding is approximately semi-circular in form and has a radius of about one or two millimeters. The angle subtended by the rounded portion, and the radius of curvature may, however, be varied over a wide range, dependent on the character of the work-piece and the degree of accuracy required, the most suitable radius being readily ascertainable from geometrical consideration of the work-piece to be produced. Usually a high degree of accuracy necessitates the use of a small radius of curvature. Also it is usually desirable to make the rounded end of uniform curvature, that is to say the rounded portion forms an arc of a circle. But in some cases it may not be necessary to adhere to this condition strictly as an approximately uniform curvature may be sufficiently satisfactory.

Another condition which is desirable where great accuracy or uniformity is required in the work-piece, is that the line of contact between the pattern and the tool holder, the centre of curvature of the rounded end of the tool, and the axis of the work-piece, shall lie on the same straight line, as shown in Figure 2.

By the use of a cutting tool having a cutting edge which is rounded as above described, a simple reciprocatory holder having the tool attached directly to it is sufficient to give the required results. Consequently the machine required for effecting the shaping operations can be of a very simple character. Moreover, by use of a plurality of tools mounted on different holders and arranged to act on different parts of the work-piece, rapid production can easily be achieved. Consequently I am able to effect important savings in capital and production costs.

Whilst I have in the foregoing described an application of my invention to the production of engine cam-shafts, my invention is not limited thereto, as it may be applied as already stated to the machining of other analogous work-pieces.

Having thus described my invention what I claim as new and desire to secure by Letters Patent is:—

1. For use in the production of cam-shafts for internal combustion engines and other analogous non-circular or eccentric bodies in machines of the lathe type, a cutting tool having at one side a cutting edge and also having a rounded extremity at the end which comes into contact with the work-piece, which rounded extremity forms with the said side of the tool a curved continuation of the cutting edge and extends the said edge from the upper towards the under side of the tool, substantially as described.

2. For use in the production of cam-shafts for internal combustion engines and other analogous non-circular or eccentric bodies in machines of the lathe type, a cutting tool as claimed in claim 1 in which the curved part of the cutting edge forms an arc of a circle and has a radius of one or two millimeters, substantially as described.

3. For use in the production of cam-shafts for internal combustion engines and other analogous non-circular or eccentric bodies in machines of the lathe type, the combination of a cutting tool having at one side a cutting edge and also having a rounded extremity at the end which comes into contact with the work-piece, which rounded extremity forms with the said side of the tool a curved continuation of the cutting edge and extends the said edge from the upper towards the under side of the tool, with a reciprocatory holder for the said tool, a slide in which the holder can be reciprocated, a rotary cam abutting against one end of the holder for moving it in one direction, and a spring associated with the slide for moving the holder in the opposite direction, substantially as described.

JOHN MORRIS.